United States Patent Office 3,313,709
Patented Apr. 11, 1967

3,313,709
PROCESS OF MAKING GLUTAMIC ACID BY FERMENTATION OF KEROSENE
Urbahn A. Phillips, Terre Haute, Ind., assignor to Commercial Solvents Corporation, a corporation of Maryland
No Drawing. Filed Oct. 14, 1963, Ser. No. 316,119
9 Claims. (Cl. 195—28)

The present invention is directed to a process for the production of L-glutamic acid. More particularly the invention relates to a process for the production of L-glutamic acid by the fermentation of nutrient fermentation media containing kerosene as a novel energy source, with certain L-glutamic acid-producing microorganisms.

Previously, L-glutamic acid has been successfully prepared utilizing various glutamic acid-producing microorganisms in an aqueous fermentation medium containing an energy source, and an assimilable nitrogen source. The energy source employed in these fermentation media has been a carbohydrate source as for example, glucose, fructose, crude sugar-containing materials prepared by hydrolyzing such starch-containing materials such as sweet potatoes, potatoes, wheat, corn, casava, and the like.

It has now been surprisingly found that with certain L-glutamic acid-producing microorganisms, the carbohydrate source in the fermentation media can be replaced with kerosene to produce good yields of L-glutamic acid. Kerosene is the petroleum fraction usually having an initial boiling point of about 370° F. and an end point of about 620° F. with a gravity generally of about 35 to 50 API and is composed essentially of saturated and unsaturated hydrocarbons of about 10 to 15 carbon atoms. The kerosene is employed in the fermentation medium in the same amounts utilized for the carbohydrate source in the previously employed fermentation, i.e. generally about 1 to 10% by volume, but preferably 3 to 7%.

It is preferred to employ along with the kerosene small amounts of a dispersing agent to insure dispersion of the kerosene throughout the aqueous fermentation medium. Any of the dispersants known to disperse oil in aqueous media can be employed. These include cationic surface active reaction products of ethylene oxide and aliphatic amines having 10 to 30 carbon atoms per molecule, non-ionic polyoxyethylene derivatives of hexitol anhydride, partial long chain fatty acid esters (Tweens), non-ionic surface active long chain fatty acid partial esters of hexitol anhydrides (Spans), non-ionic surface active alkyl aryl polyether alcohols having the general formula

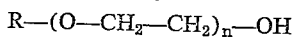

$$R-(O-CH_2-CH_2)_n-OH$$

where R is an alkyl aryl alcohol and $n$ is an integer of about 5 to 100 or more (Titrons).

The amounts of dispersant utilized may vary but in each case are sufficient to provide an effective dispersion. Ordinarily, the amount of dispersant, if utilized, will fall in the range of about .00025 to .001, preferably .0003 to .0008 percent by weight.

The L-glutamic acid-producing microorganisms employed in the process of the present invention are *Pseudomonas methanica*, *Serratia marcesens*, *Pseudomonas aeruginosa*, *Pseudomonas fluorescens* and *Pseudomonas oleovarans*. It was particularly surprising to obtain the advantageous results when using these microorganisms with kerosene since it had been found that many microorganisms known to provide satisfactory yields of L-glutamic acid with fermentation media containing a carbohydrate source as the energy source, provide no or insignificant yields of L-glutamic acid when employed with the fermentation medium containing kerosene. For example, the following microorganisms were not satisfactory in the fermentation of the present invention: *Brevibacterium divaricatum*, *Candida utilis*, *Aerobacter aerogens*, *Escherichia coli*, *Bacillus cereus* and *Nocardia coeliaca*.

According to the process of the present invention, a microorganism selected from the group identified above is incubated in an aqueous nutrient medium containing kerosene as an energy source at a temperature preferably between about 27° C. and about 35° C. under submerged conditions of agitation and aeration. The nutrient media, in addition to the kerosene, contains a nitrogen source in either organic or inorganic form, such as urea, ammonium salts such as ammonium chloride, ammonium sulfate, and ammonium tartrate. Also a source of phosphorus such as dipotassium or sodium phosphate is advantageously used to provide suitable yields. Other mineral salts such as magnesium sulfate and ferrous sulfate can also be utilized with desirable results. Growth stimulant materials such as biotin, desthiobiotin, peptone, meat extracts, corn steep liquor, casein-hydrolyzate, wheat bran extracts and the like, can be utilized with desirable results. Biotin can advantageously be used in amounts of about 1 to 5 micrograms per liter and preferably 2 to 3 micrograms per liter of nutrient medium.

The media are preferably maintained at a pH ranging from 6 to 9 during the fermentation which ordinarily is completed within 1 to 3 days' time when conducted under aeration-agitation conditions or by shaking.

In the specific examples cited below for purposes of illustrating our new process for the production of L-glutamic acid, the L-glutamic acid produced was recovered at the end of the fermentation by removing the microorganism by filtration or centrifuging. The resulting filtrate was concentrated, adjusted to a pH of 3.2 by the addition of acid and the glutamic acid was salted out at reduced temperatures. If a product of high grade or purity is desired, the concentrate is first subjected to ion-exchange resin treatment in order to remove impurities before salting out. After adsorption on the ion-exchange resin, the L-glutamic acid is eluted therefrom, the solution containing the acid is again concentrated, the acid is salted out at reduced temperature, is recovered by centrifuging, and then recrystallized if desired.

It is understood that the examples given below are for purposes of illustration only and that we are not bound to the specific ingredients or amounts thereof or to the other specific operating conditions other than previously broadly set forth herein.

Example I

*Pseudomonas methanica* was cultivated for 24 hours at 30° C. on a seed culture medium of the following composition:

| | | |
|---|---|---|
| Kerosene | percent by vol | 5.0 |
| K₂HPO₄ | grams | 2.5 |
| MgSO₄·7H₂O | do | 1.0 |
| Tween 20 | do | 0.005 |
| MnSO₄·2H₂O | p.p.m | 4 |
| FeSO₄·7H₂O | p.p.m | 4 |
| Urea | grams | 4.0 |
| Tap water | ml | 1000 |
| Agar | grams | 20 |

20 ml. of the following medium were placed in 500 ml. flasks and the contents thereof sterilized for 15 minutes at 115° C.

| | | |
|---|---|---|
| Kerosene | percent by vol | 5 |
| K₂HPO₄ | grams | 2.5 |
| MgSO₄·7H₂O | do | 1.0 |
| Tween 20 | do | 0.005 |
| MnSO₄·2H₂O | p.p.m | 4 |
| FeSO₄·7H₂O | p.p.m | 4 |
| Urea | grams | 8.0 |
| Biotin | micrograms | 2.5 |
| Tap water | ml | 1000 |

Each flask was then inoculated with one loopful of seed culture prepared as above described and the flasks then incubated at 30° C. with shaking while maintaining an oxygen absorption coefficient of $2.5 \times 10^{-6}$ gram mole of oxygen per ml. per minute. At the end of 24 hours, 1.0 ml. of a 25% aqueous solution of urea was added to the flasks to supply nitrogen and to maintain the pH neutral or weakly alkaline.

At the end of 48 hours the fermenting medium was found to contain 7.9 grams of L-glutamic acid.

*Examples II to V*

The following examples were conducted using essentially the some procedure used in Example I but employing the microorganisms identified in the table below. The results are also given in the table.

| Example | Microorganism | Yield of L-glutamic acid, grams |
|---------|---------------|-------------------------------|
| II | Serratia marcesens | 3.8 |
| III | Pseudomonas aeruginosa | 3.0 |
| IV | Pseudomonas fluorescens | 3.5 |
| V | Pseudomonas oleovorans | 3.5 |

It is claimed:

1. In the production of L-glutamic acid by cultivating an L-glutamic acid-producing microorganism in an aqueous nutrient fermentation medium containing an energy source and an assimilable nitrogen source, the method which comprises employing kerosene as the energy source and an L-glutamic acid-producing microorganism selected from the group consisting of *Pseudomonas methanica, Serratia marcesens, Pseudomonas aeruginosa, Pseudomonas fluorescens, Pseudomonas oleovorans*.

2. The process of claim 1 wherein said cultivation takes place at a temperature ranging from about 27° to 35° C.

3. The process of claim 1 wherein the medium contains an assimilable phosphorus source; a growth stimulating agent, and the kerosene is dispersed in the medium with a dispersing agent for dispersing oil in an aqueous media.

4. The process of claim 1 wherein the microorganism is *Pseudomonas methanica*.

5. The process of claim 3 wherein the microorganism is *Pseudomonas methanica* and the growth stimulator is biotin which is present in amounts of about 1 to 5 micrograms per liter of nutrient medium.

6. The process of claim 1 wherein the microorganism is *Serratia marcesens*.

7. The process of claim 1 wherein the microorganism is *Pseudomonas aeruginosa*.

8. The process of claim 1 wherein the microorganism is *Pseudomonas fluorescens*.

9. The process of claim 1 wherein the microorganism is *Pseudomonas oleovorans*.

References Cited by the Examiner

UNITED STATES PATENTS

| 2,749,279 | 6/1956 | Smythe et al. | 195—30 |
| 3,002,889 | 10/1961 | Kinoshita et al. | 195—47 |

FOREIGN PATENTS 588,846  12/1959  Canada.

OTHER REFERENCES

Kinoshita et al. (III), Journal of General Applied Microbiology (Tokyo) vol. 3, No. 3, pp. 193–205, 1957.

Shiio et al.: Journal of General Applied Microbiology, vol. 9, No. 1, pp. 23–30, January 1963.

Yamada et al.: Agricultural and Biological Chemistry (Japan) vol. 26, No. 9, p. 636, September 1962.

A. LOUIS MONACELL, *Primary Examiner.*

L. M. SHAPIRO, *Assistant Examiner.*